A. H. BARBER.
Animal-Trap.
No. 199,775.   Patented Jan. 29, 1878.
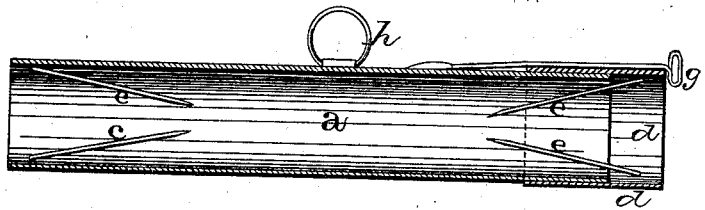
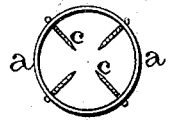

UNITED STATES PATENT OFFICE.

ABREM H. BARBER, OF RED OAK, IOWA.

IMPROVEMENT IN ANIMAL-TRAPS.

Specification forming part of Letters Patent No. 199,775, dated January 29, 1878; application filed December 11, 1877.

*To all whom it may concern:*

Be it known that I, ABREM H. BARBER, of Red Oak, in the county of Montgomery and State of Iowa, have invented certain new and useful Improvements in Animal-Traps; and I do hereby declare the following to be a full, clear, and exact description of the invention, such as will enable others skilled in the art to which it pertains to make and use it, reference being had to the accompanying drawings, which form part of this specification.

My invention relates to an improvement in animal-traps; and it consists in a tube or hollow cylinder, which is provided with yielding inwardly-turned spikes at one end, and a removable sleeve, also provided with the inwardly-turned spikes at the other, so that an animal can pass into either end of the tube, but will be prevented from either passing on through the tube or escaping backward by the spikes, as will be more fully described hereinafter.

Figure 1 is a longitudinal section of my invention. Fig. 2 is a vertical cross-section of the same.

$a$ represents a tube, of any suitable length or size, provided at one end with the inwardly-turned spikes $c$, as shown. Upon the other end of this tube or cylinder is the sleeve $d$, which is also provided with inwardly-turned spikes $e$, and which sleeve is held in position by means of the spring-catch $g$.

To the top of the cylinder is attached a handle or ring, $h$, for convenience in carrying the trap and fastening it in its place.

Owing to the peculiar shape of the trap, which is that of a long empty tube, it can be placed in an animal's hole, so that, as the animal is either passing into or out of his hole, it will not notice the trap until it has passed partially through the yielding spikes $c$ or $e$. Should it pass entirely through the spikes at one end, the sharp points of the spikes at the other end will prevent it from passing on through, and the spikes at the end through which it entered will prevent it from escaping backward. Should the animal have passed only partially through the spikes at one end, and then should attempt to escape, the spikes will stick into it, and the harder it struggles the more sharply the points of the spikes will catch in the hide and flesh.

By having the sleeve $d$ slipped over one end and held by a spring-catch, whenever it is desired to release an animal that has been caught it is only necessary to slip the sleeve off the end of the tube, when the animal can be dropped out. In slipping the sleeve upon the end of the tube the spring-catch automatically locks it in place.

It is evident that the tube or cylinder can be made of any length or size that may be preferred, so as not only to catch a single animal, but a number of them, and is equally adapted for placing the trap in the entrance to an animal's hole as it is to be set out upon the open ground or floor.

Owing to the simple construction of the trap it can be made and sold for a very small price, and is so simple in construction that a tinner or ony one in the habit of working in metals can make them.

The round form, as here shown, is preferred; but it is evident that the square, half-round, or any other shape will answer just as well.

Having thus described my invention, I claim—

An animal-trap consisting of the tube or cylinder $a$, provided with the spikes $c$ at one end, and sleeve $d$, spikes $e$, and the catch for holding the sleeve in position, substantially as shown and described.

In testimony that I claim the foregoing I have hereunto set my hand this 16th day of November, 1877.

ABREM H. BARBER.

Witnesses:
 GEO. C. JUNKIN,
 J. M. JUNKIN.